(12) United States Patent
Dame

(10) Patent No.: US 11,364,992 B2
(45) Date of Patent: Jun. 21, 2022

(54) ALIGNING AIRCRAFT WITH RUNWAY CENTERLINE DURING TAKEOFF

(71) Applicant: The Boeing Company, Chicago, IL (US)

(72) Inventor: Stephen G. Dame, Seattle, WA (US)

(73) Assignee: The Boeing Company, Chicago, IL (US)

( * ) Notice: Subject to any disclaimer, the term of this patent is extended or adjusted under 35 U.S.C. 154(b) by 912 days.

(21) Appl. No.: 16/168,429

(22) Filed: Oct. 23, 2018

(65) Prior Publication Data

US 2020/0122820 A1     Apr. 23, 2020

(51) Int. Cl.
| | |
|---|---|
| G05D 1/02 | (2020.01) |
| B64C 13/16 | (2006.01) |
| G06T 7/00 | (2017.01) |
| G06T 7/70 | (2017.01) |
| B64C 9/00 | (2006.01) |

(Continued)

(52) U.S. Cl.
CPC ............... B64C 13/16 (2013.01); B64C 9/00 (2013.01); B64C 39/024 (2013.01); G05D 1/0088 (2013.01); G05D 1/0202 (2013.01); G06T 7/60 (2013.01); G06T 7/70 (2017.01); G06T 7/97 (2017.01); *B64C 2201/021* (2013.01); *B64C 2201/141* (2013.01); *G06T 2207/30256* (2013.01)

(58) Field of Classification Search
CPC ......... B64C 13/16; B64C 9/00; B64C 39/024; B64C 2201/021; B64C 2201/141; G05D 1/0088; G05D 1/0202; G05D 1/0661; G06T 7/60; G06T 7/70; G06T 7/97; G06T 2207/30256; Y02T 50/80; G08G 5/0021; G08G 5/0065; B64D 47/08; B64D 2205/00; G06K 9/0063
See application file for complete search history.

(56) References Cited

U.S. PATENT DOCUMENTS

| | | | |
|---|---|---|---|
| 10,247,573 B1* | 4/2019 | Gavrilets | B64D 47/08 |
| 2008/0177427 A1* | 7/2008 | Marty | G08G 5/065 |
| | | | 701/3 |

(Continued)

FOREIGN PATENT DOCUMENTS

DE     103 05 993     8/2004

OTHER PUBLICATIONS

Extended European Search Report prepared by the European Patent Office in application No. EP 19 19 2870.4 dated Mar. 9, 2020.

*Primary Examiner* — Masud Ahmed
(74) *Attorney, Agent, or Firm* — McDonnell Boehnen Hulbert & Berghoff LLP

(57) ABSTRACT

Described herein is an example method for aligning an aircraft with a centerline of a runway during takeoff. The method includes accessing a first image captured by a first camera mounted on a first side of the aircraft; accessing a second image captured by a second camera mounted on a second side of the aircraft that is opposite the first side; determining a first angle between a first marked line on the runway in the first image and a first reference line in the first image; determining a second angle between a second marked line on the runway in the second image and a second reference line in the second image; and based on the first angle and the second angle, moving a control surface of the aircraft such that the aircraft moves closer to the centerline of the runway.

20 Claims, 11 Drawing Sheets

(51) Int. Cl.
  *B64C 39/02* (2006.01)
  *G05D 1/00* (2006.01)
  *G06T 7/60* (2017.01)

(56) References Cited

U.S. PATENT DOCUMENTS

| | | | |
|---|---|---|---|
| 2013/0138273 A1* | 5/2013 | Koukol | G08G 5/0065 |
| | | | 701/15 |
| 2015/0142220 A1* | 5/2015 | Scacchi | G08G 5/065 |
| | | | 701/3 |
| 2018/0301045 A1* | 10/2018 | Pesik | G06T 7/73 |
| 2018/0370566 A1* | 12/2018 | Kojo | B60R 21/00 |
| 2019/0100139 A1* | 4/2019 | Koravadi | B60R 1/00 |
| 2019/0248480 A1* | 8/2019 | Whitten, Jr. | B64C 27/28 |
| 2021/0086759 A1* | 3/2021 | Yamanaka | B60W 30/06 |

\* cited by examiner

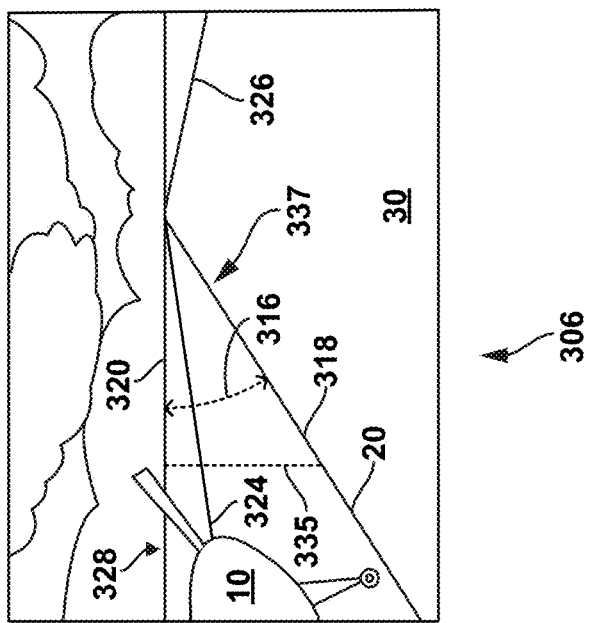
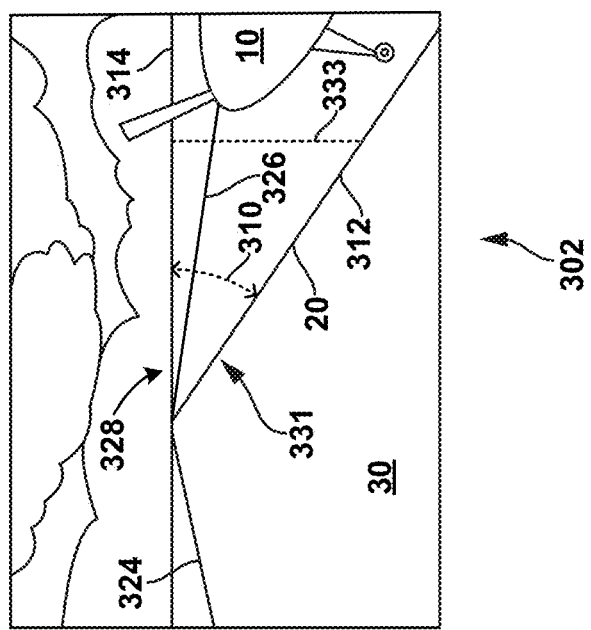
FIG. 3

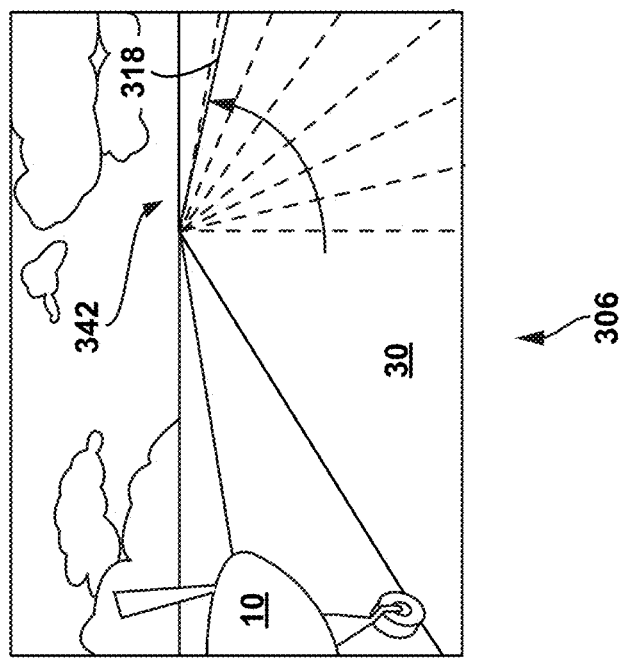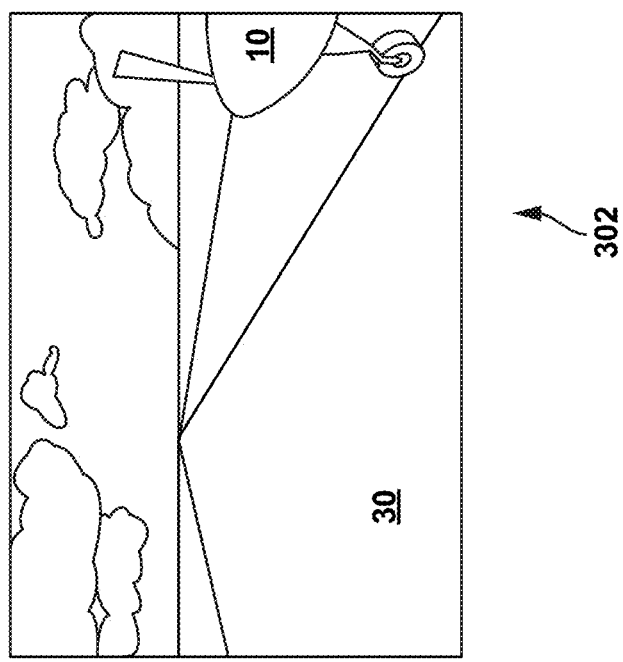
FIG. 5

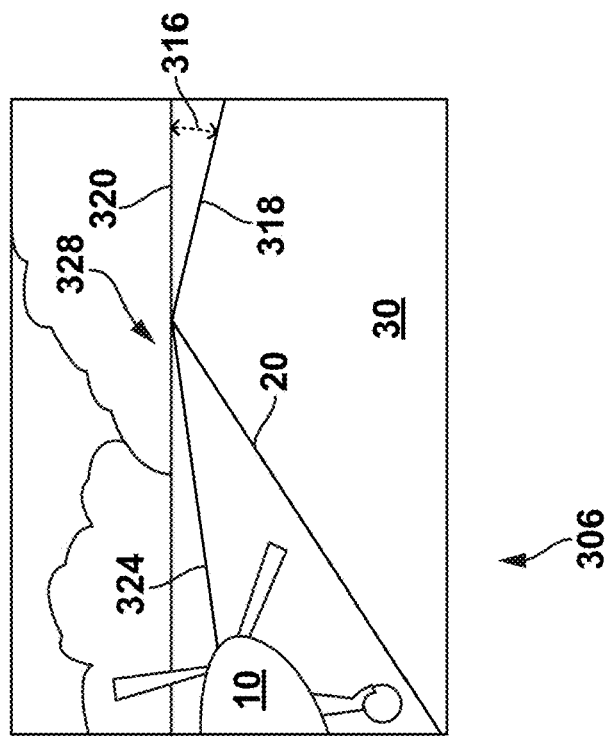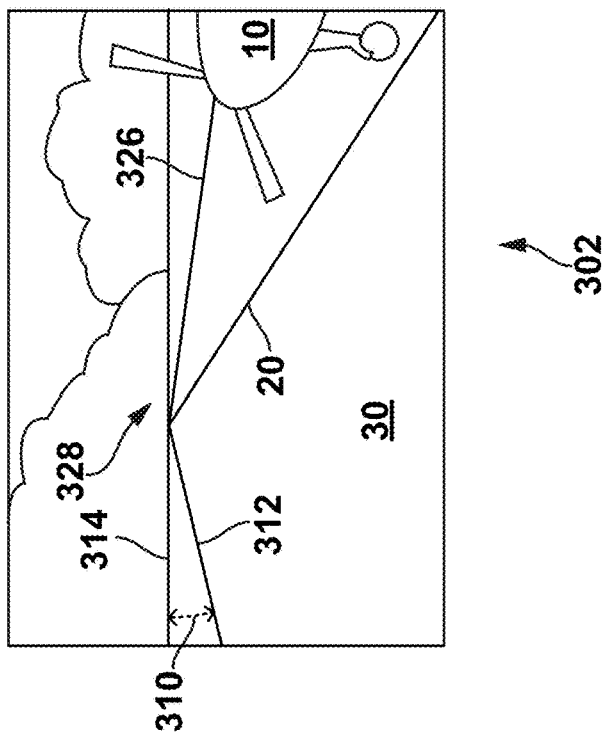
FIG. 6

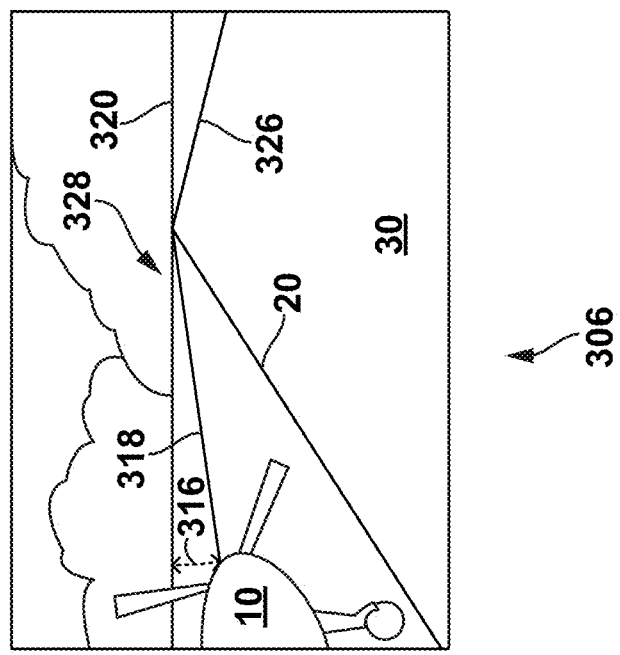
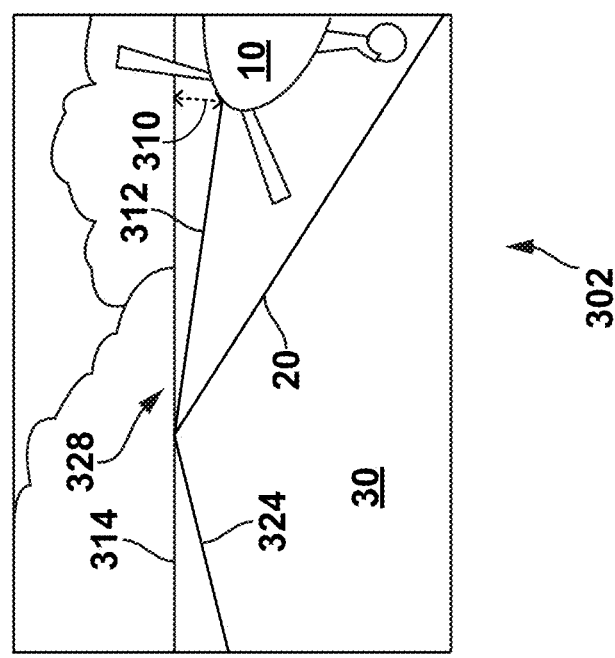
FIG. 7

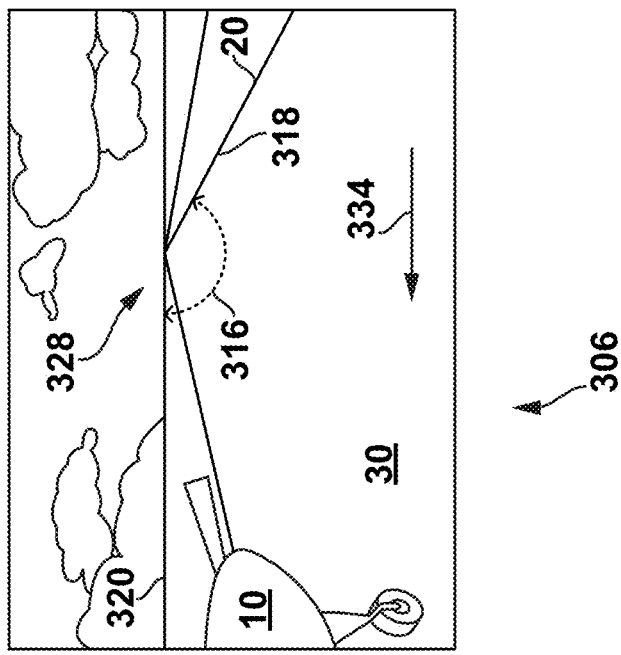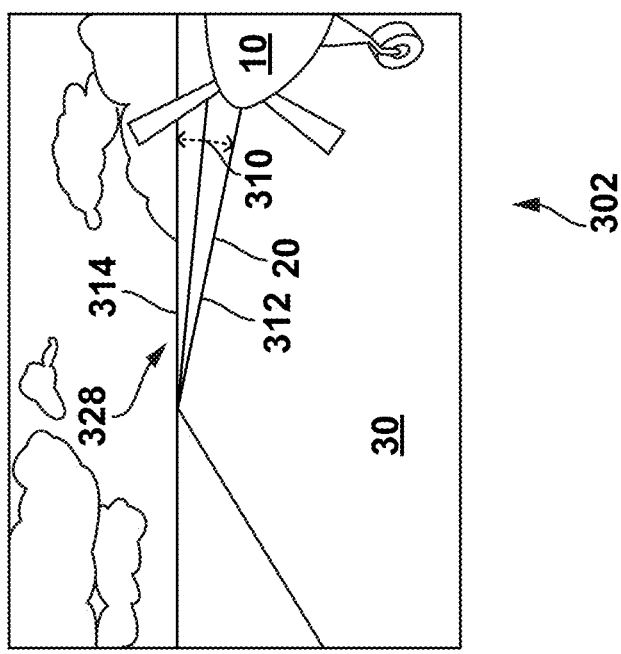
FIG. 8

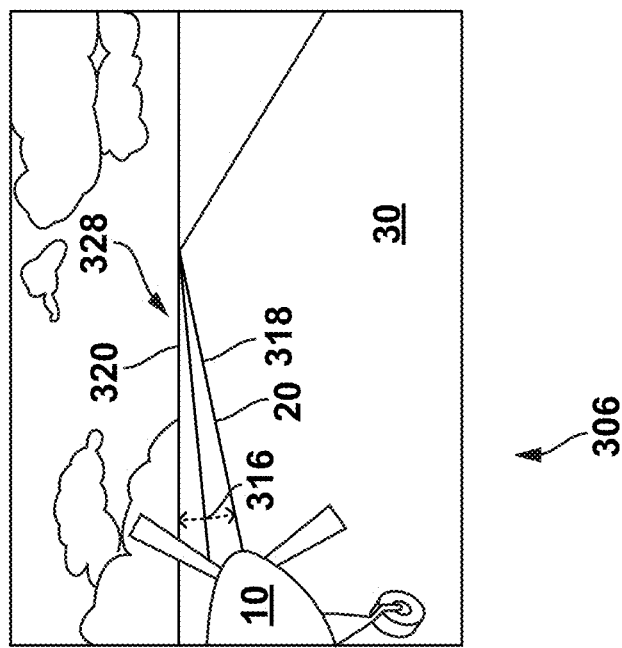
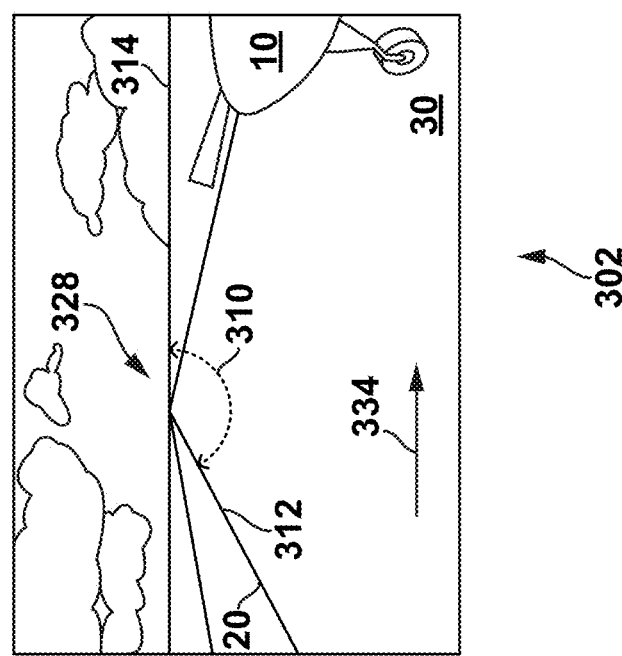
FIG. 10

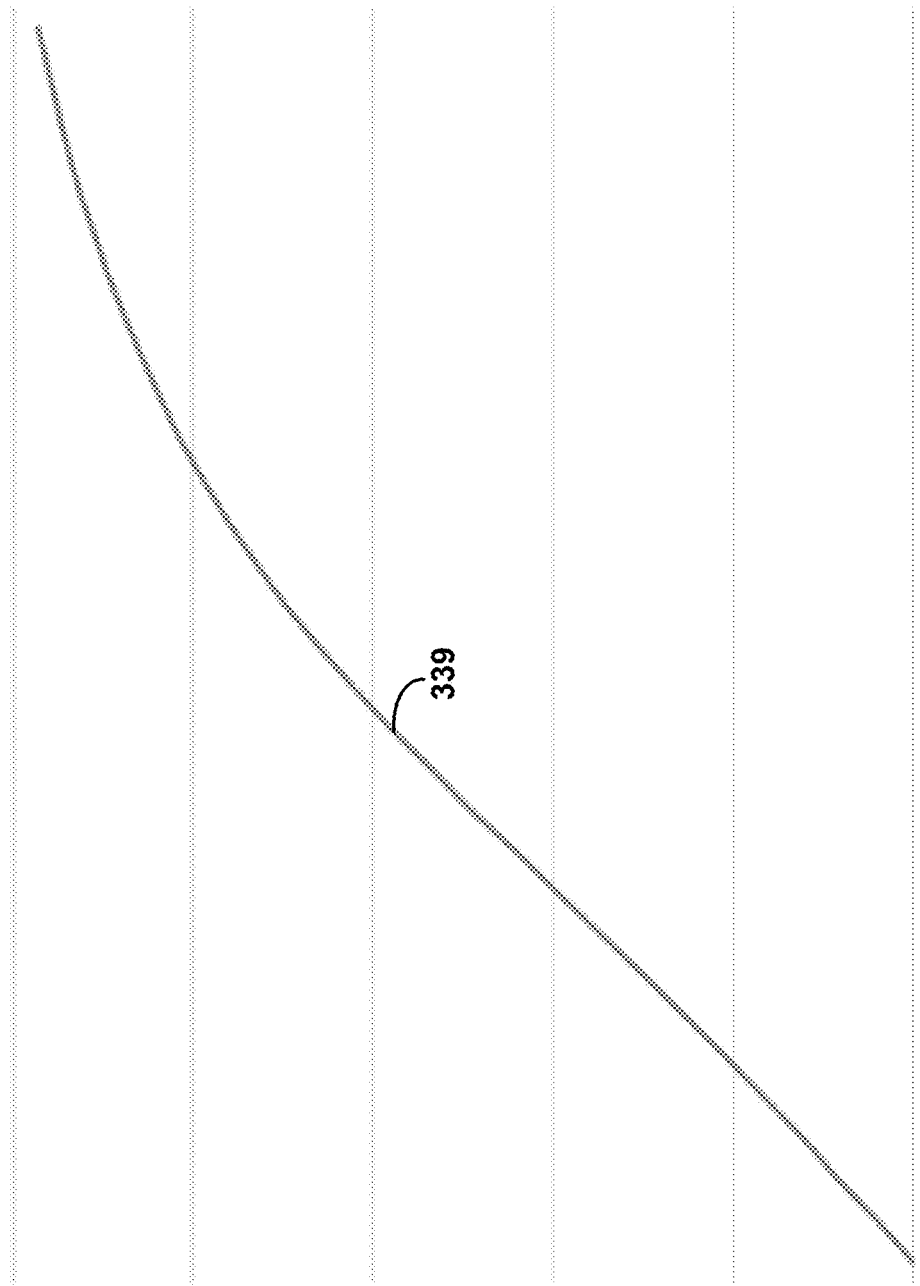

US 11,364,992 B2

ALIGNING AIRCRAFT WITH RUNWAY CENTERLINE DURING TAKEOFF

FIELD

The present disclosure generally relates to computing devices and methods for aligning an aircraft with a runway centerline during takeoff, and more specifically to computing devices and methods for using image capture and image analysis to align an aircraft with a runway centerline during takeoff.

BACKGROUND

Unmanned aerial vehicles (UAVs) continue to become more commonly used in contexts such as national defense, policing, academic research, commerce, and entertainment. Some UAVs are at least partially autonomous (e.g., autonomous unmanned aerial vehicles (AUAVs)). AUAVs present navigational challenges such as automated takeoff. That is, an on-board or otherwise networked computing device often is tasked with steering and throttling the AUAV as it accelerates down a runway during takeoff. More specifically, the AUAV typically maintains its (e.g., longitudinal) centerline reasonably close to a centerline of the runway as it accelerates down the runway.

One approach for accomplishing this is to use neural networks or other machine learning techniques, but these techniques typically require a computing device to train itself by analyzing thousands of images prior to operation, typically require a high level of computing resources during operation, and could misidentify runway centerlines in cases in which the runway has an atypical appearance. Thus, a need exists for more efficient and reliable methods of aligning an aircraft with a runway centerline during takeoff.

SUMMARY

One aspect of the disclosure is a computing device comprising: one or more processors; and a computer readable medium storing instructions that, when executed by the one or more processors, cause the computing device to perform functions for aligning an aircraft with a centerline of a runway during takeoff, the functions comprising: accessing a first image captured by a first camera mounted on a first side of the aircraft; accessing a second image captured by a second camera mounted on a second side of the aircraft that is opposite the first side; determining a first angle between a first marked line on the runway in the first image and a first reference line in the first image; determining a second angle between a second marked line on the runway in the second image and a second reference line in the second image; and based on the first angle and the second angle, moving a control surface of the aircraft such that the aircraft moves closer to the centerline of the runway.

Another aspect of the disclosure is a non-transitory computer readable medium storing instructions that, when executed by a computing device, cause the computing device to perform functions for aligning an aircraft with a centerline of a runway during takeoff, the functions comprising: accessing a first image captured by a first camera mounted on a first side of the aircraft; accessing a second image captured by a second camera mounted on a second side of the aircraft that is opposite the first side; determining a first angle between a first marked line on the runway in the first image and a first reference line in the first image; determining a second angle between a second marked line on the runway in the second image and a second reference line in the second image; and based on the first angle and the second angle, moving a control surface of the aircraft such that the aircraft moves closer to the centerline of the runway.

A further aspect of the disclosure is a method for aligning an aircraft with a centerline of a runway during takeoff, the method comprising: accessing a first image captured by a first camera mounted on a first side of the aircraft; accessing a second image captured by a second camera mounted on a second side of the aircraft that is opposite the first side; determining a first angle between a first marked line on the runway in the first image and a first reference line in the first image; determining a second angle between a second marked line on the runway in the second image and a second reference line in the second image; and based on the first angle and the second angle, moving a control surface of the aircraft such that the aircraft moves closer to the centerline of the runway.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 3 shows images captured by respective cameras mounted on an aircraft, according to an example.

FIG. 5 shows images captured by respective cameras mounted on an aircraft, according to an example.

FIG. 6 shows images captured by respective cameras mounted on an aircraft, according to an example.

FIG. 7 shows images captured by respective cameras mounted on an aircraft, according to an example.

FIG. 8 shows images captured by respective cameras mounted on an aircraft, according to an example.

FIG. 10 shows images captured by respective cameras mounted on an aircraft, according to an example.

FIG. 11 shows a relationship between (i) a magnitude of a difference between a first angle and a second angle that are related to a position of an aircraft on a runway and (ii) a magnitude of a deflection angle of a control surface of the aircraft, according to an example.

DETAILED DESCRIPTION

Figure 1:
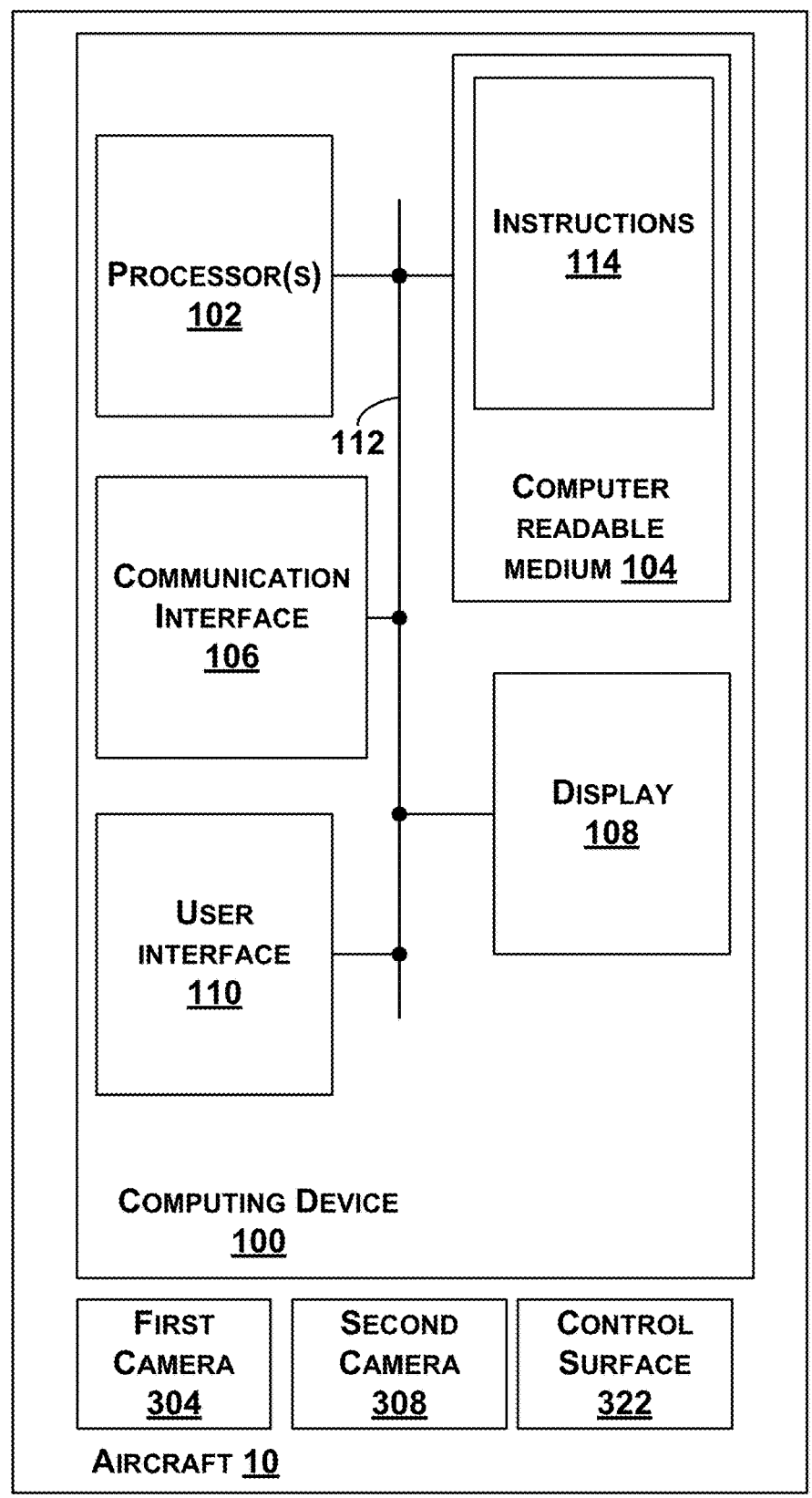
FIG. 1 is a schematic diagram of a computing device, according to an example.

As discussed above, there exists a need for more efficient and reliable methods of aligning an aircraft (e.g., a manned aircraft, UAV, or AUAV) with a runway centerline during takeoff. Accordingly, this disclosure includes such methods and computing devices.

Within examples, a computing device can access a first image captured by a first camera mounted on a first side of the aircraft and access a second image captured by a second camera mounted on a second side of the aircraft that is opposite the first side. For instance, the computing device can cause the first camera to capture the first image from a port side (e.g., a wing) of the aircraft and cause the second camera to capture the second image from a starboard side (e.g., a wing) of the aircraft. The first image and the second image are typically captured simultaneously during takeoff. The first camera and the second camera will typically be mounted on the aircraft to be forward-looking with respect to the aircraft.

Next, the computing device can determine a first angle between a first marked line on the runway in the first image and a first reference line in the first image. For example, the computing device can determine a first angle between a centerline of the runway in the first image and a horizon in the first image. In other examples, the first marked line can take the form of a left boundary line or a right boundary line of the runway, and the first reference line can take the form of any line that is parallel to the horizon.

The computing device can identify the first marked line by identifying, from among a plurality of lines of pixels of the first image, a line of pixels having an average color that is closest to a (e.g., known) color of the first marked line. The computing device can also identify the first reference line by identifying, from among a plurality of lines of pixels of the first image, a line of pixels defining a boundary between a region of the first image having a color that corresponds to the sky and a region of the first image having a color that corresponds to the earth and/or the runway.

The computing device can also determine a second angle between a second marked line on the runway in the second image and a second reference line in the second image. For example, the computing device can determine a second angle between the centerline of the runway in the second image and the horizon in the second image. In other examples, the second marked line can take the form of a left boundary line or a right boundary line of the runway (e.g., the boundary line that is not the first marked line), and the second reference line can take the form of any line that is parallel to the horizon.

The computing device can identify the second marked line by identifying, from among a plurality of lines of pixels of the second image, a line of pixels having an average color that is closest to a (e.g., known) color of the second marked line. The computing device can also identify the second reference line by identifying, from among a plurality of lines of pixels of the second image, a line of pixels defining a boundary between a region of the second image having a color that corresponds to the sky and a region of the second image having a color that corresponds to the earth and/or the runway.

Next, the computing device can, based on the first angle and the second angle, move a control surface (e.g., a rudder) of the aircraft such that the aircraft moves closer to the centerline of the runway. The computing device will generally determine a difference between the first angle and the second angle and use that difference to determine a deflection angle between the control surface and a centerline of the aircraft that tends to cause the aircraft to move closer to the centerline of the runway when the aircraft is moving forward.

The methods disclosed herein can be advantageous because, when compared to conventional methods of autonomously controlling an aircraft during takeoff, the disclosed methods generally consume less computing resources, involve less burdensome pre-operation calibration, and are less error prone.

Implementations of this disclosure provide technological improvements that are particular to computer networks and computing devices, for example, computing devices used to autonomously control aircraft during takeoff.

Computing device-specific technological problems, such as the management and use of large quantities of complex data stemming from multiple sources, as well as inefficiency associated therewith, can be wholly or partially solved by the implementations of this disclosure. For example, implementation of this disclosure can eliminate the time spent "training" a computing device with reference images before operation and can reduce the amount of computing resources consumed during operation. Thus, implementation of this disclosure can reduce the cost and complexity of implementing less efficient methods and systems for autonomously controlling an aircraft during takeoff. As another example, implementation of this disclosure increases the accuracy and reliability of runway line identification.

Implementations of this disclosure can thus introduce new and efficient improvements in the ways in which a computing device controls an aircraft during takeoff, and in turn facilitates new and efficient improvements in the ways in which the associated data is used to diagnose and resolve problems.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Referring now to FIG. 1, a computing device 100 is illustrated. In some examples, components illustrated in FIG. 1 may be distributed across multiple computing devices or computing devices. However, for the sake of example, the components are shown and described as part of the computing device 100. The computing device 100 may be or include a mobile device (such as a mobile phone), a desktop computer, a laptop computer, a tablet computer, a server, a network of multiple servers, or similar device(s) that can be configured to perform the functions described herein.

As shown in FIG. 1, the computing device 100 includes one or more processors 102, a non-transitory computer readable medium 104, a communication interface 106, a display 108, and a user interface 110. Components illustrated in FIG. 1 may be linked together by a system bus, network, or other connection mechanism 112.

The one or more processors 102 can be any type of processor(s), such as a microprocessor, a digital signal processor, a multicore processor, etc., coupled to the non-transitory computer readable medium 104. The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can be configured to store instructions 114. The instructions 114 may be executable by the one or more processors 102 to cause the computing device 100 to perform any of the functions described herein.

The communication interface 106 can include hardware to enable communication within the computing device 100 and/or between the computing device 100 and one or more other devices. The hardware can include transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices.

The display 108 can be any type of display component configured to display data. As one example, the display 108 can include a touchscreen display. As another example, the display 108 can include a flat-panel display, such as a liquid-crystal display (LCD) or a light-emitting diode (LED) display.

The user interface 110 can include one or more pieces of hardware used to provide data and control signals to the computing device 100. For instance, the user interface 110 can include a mouse or a pointing device, a keyboard or a keypad, a microphone, a touchpad, or a touchscreen, among other possible types of user input devices. Generally, the user interface 110 can enable an operator to interact with a graphical user interface (GUI) provided by the computing device 100 (e.g., displayed by the display 108).

The computing device 100 is typically part of an aircraft 10. The aircraft 10 (e.g., an unmanned aerial vehicle) further includes a first camera 304, a second camera 308, and a control surface 322.

The first camera 304 and the second camera 308 will each typically take the form of a visible light camera, but other forms are possible. The control surface 322 can take the form of a rudder, but might also include a flap, an aileron, an elevator, etc.

Figure 2:
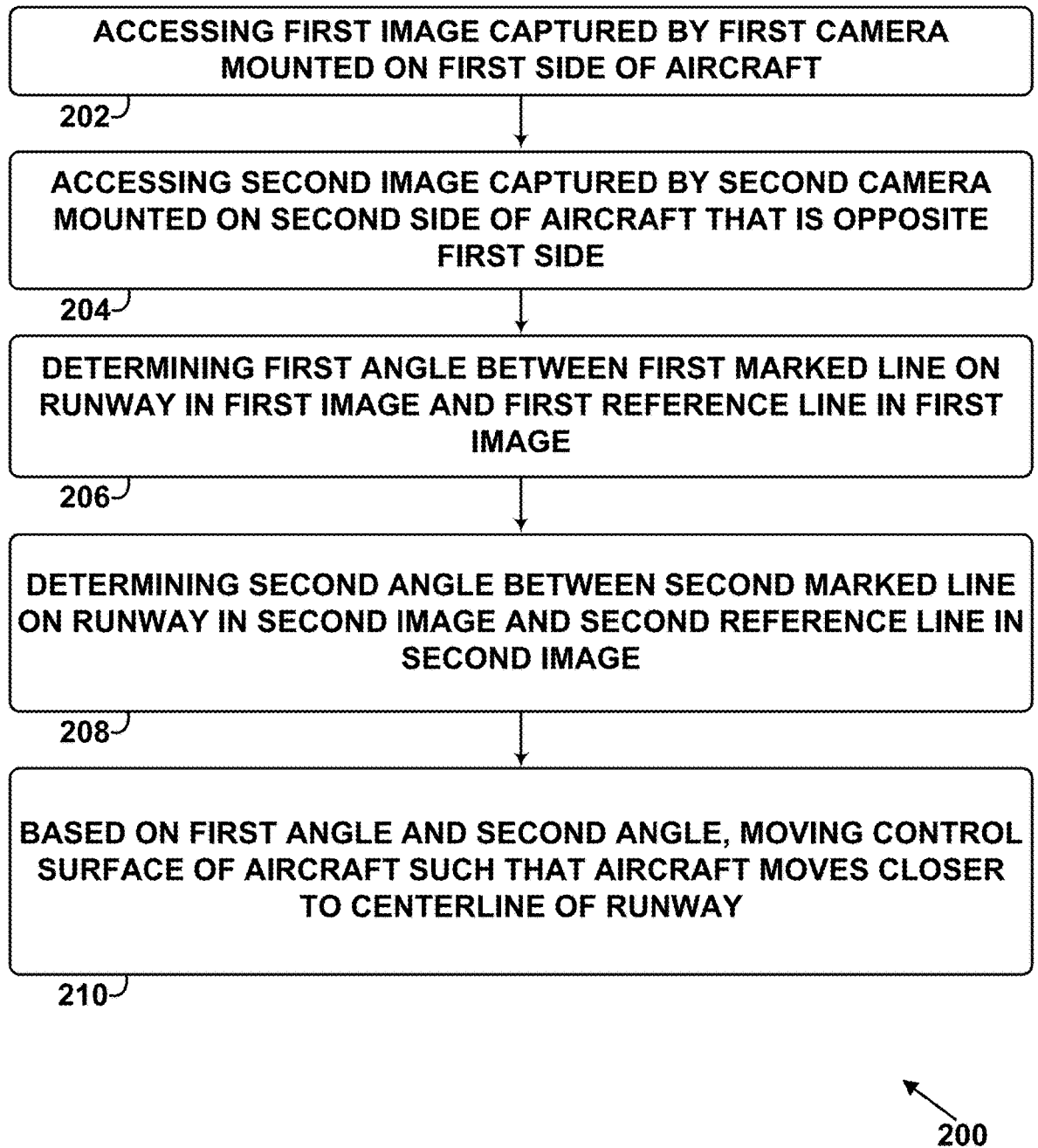
FIG. 2 is a flow diagram of a method, according to an example.

FIG. 2 is a flow diagram of a method 200 for aligning an aircraft with a centerline of a runway during takeoff. Referring to FIG. 3, the method 200 can involve the computing device 100 aligning the aircraft 10 with a centerline 20 of a runway 30 during takeoff.

Figure 4:
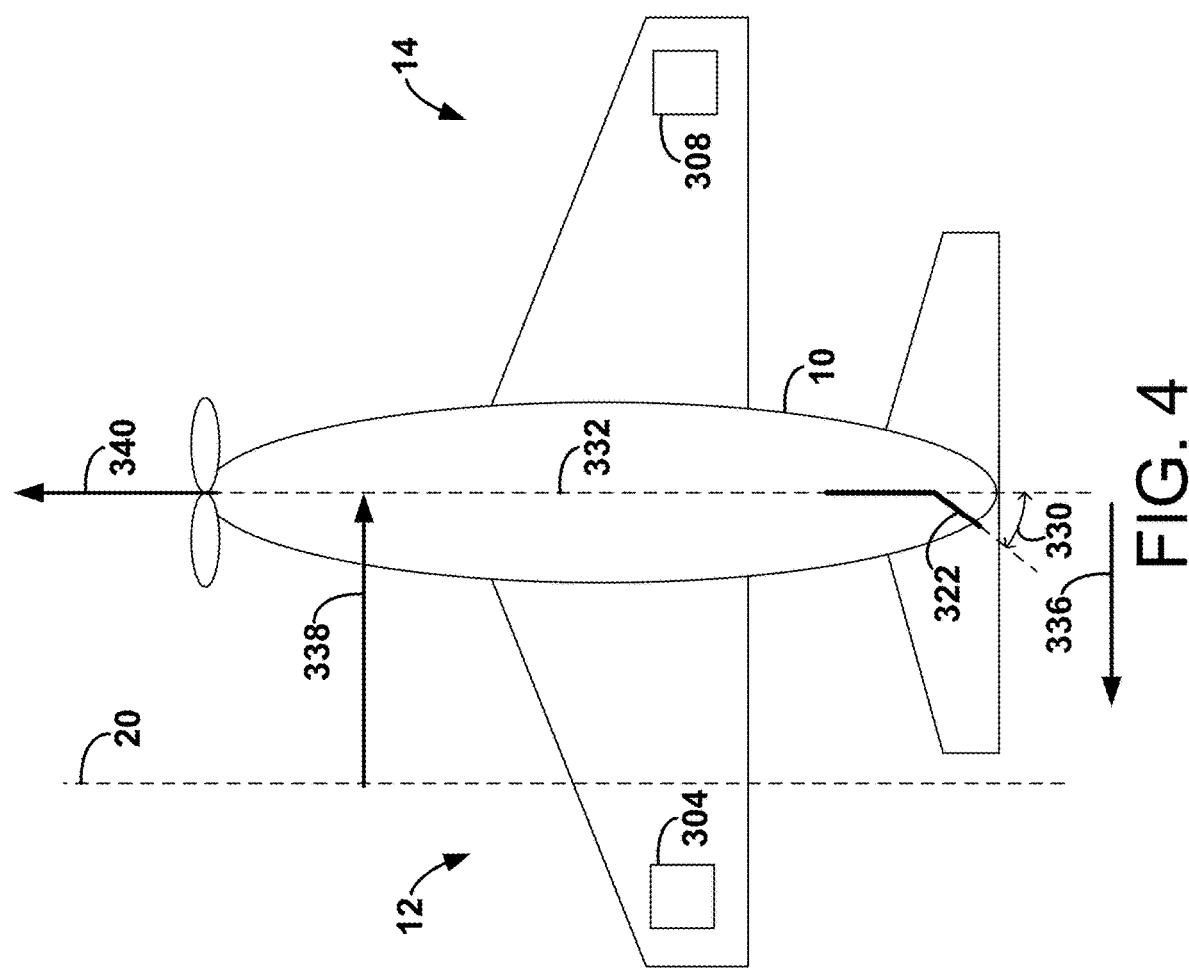
FIG. 4 is a schematic overhead view of an aircraft, according to an example.

Referring to FIG. 2, at step 202 the method 200 includes accessing a first image captured by a first camera mounted on a first side of the aircraft. Referring to FIGS. 3 and 4, the computing device 100 can access a first image 302 captured by the first camera 304 mounted on a first side 12 (e.g., a port side wing) of the aircraft 10. In some examples, the computing device 100 causes the first camera 304 to capture the first image 302.

Referring to FIG. 2, at step 204 the method 200 includes accessing a second image captured by a second camera mounted on a second side of the aircraft that is opposite the first side. Referring to FIGS. 3 and 4, the computing device 100 can access a second image 306 captured by the second camera 308 mounted on a second side 14 (e.g., a starboard side wing) of the aircraft 10. In some examples, the computing device 100 causes the second camera 308 to capture the second image 306 (e.g., simultaneous with capture of the first image 302). Referring to FIG. 4, the first camera 304 and the second camera 308 are typically positioned substantially symmetrically with respect to a centerline 332 of the aircraft 10 and are typically positioned to each have an optical axis that is parallel with the centerline 332.

Referring to FIG. 2, at step 206 the method 200 includes determining a first angle between a first marked line on the runway in the first image and a first reference line in the first image. Referring to FIG. 3, the computing device 100 can determine a first angle 310 between a first marked line 312 on the runway 30 in the first image 302 and a first reference line 314 in the first image 302. In the example of FIG. 3, the first marked line 312 is the centerline 20 of the runway 30 and the first reference line 314 is a horizon 328 (e.g., where the sky and earth meet). In other examples (e.g., those discussed below), the first marked line 312 takes on different forms. The first reference line 314 could alternatively take the form of any line that is substantially parallel with the horizon 328 in the first image 302.

As shown in FIG. 3, the first reference line 314 forms an adjacent side of a right triangle 331 and the first marked line 312 forms a hypotenuse of the right triangle 331 with respect to the first angle 310. An opposite side 333 of the right triangle 331 is shown in FIG. 3, but could take the form of any line segment that forms a right angle with the first reference line 314 and has endpoints respectively at the first reference line 314 and the first marked line 312.

In some examples, the computing device 100 determines the first angle 310 by calculating the arcsine of the quotient of the length of the opposite side 333 divided by the length of a portion of the first marked line 312 (e.g., the hypotenuse of the right triangle 331).

In some examples, prior to determining the first angle 310, the computing device 100 identifies the first marked line 312 by determining that the first marked line 312, a third marked line 324 (e.g., a left boundary line), and a fourth marked line 326 (e.g., a right boundary line) converge at or beyond the horizon 328 within the first image 302. Additionally, the computing device 100 can identify the first marked line 312, the third marked line 324, and the fourth marked line 326 based on determining that the third marked line 324 is to the left of the first marked line 312, and that the first marked line 312 is to the left of the fourth marked line 326.

Referring to FIG. 5 for example, the computing device 100 can identify the second marked line 318 (e.g., a right boundary line) by identifying, from among a plurality of lines 342 of pixels of the second image 306, a line of pixels having an average color that is closest to a (e.g., known) color of the second marked line 318. Referring to FIG. 3, the computing device 100 can similarly identify the first marked line 312 by identifying, from among a plurality of lines of pixels of the first image 302, a line of pixels having an average color that is closest to a (e.g., known) color of the first marked line 312. That is, the computing device 100 can analyze lines of pixels to determine their respective average pixel colors (e.g., on the Red Green Blue (RGB) color scale) and determine that the line of the plurality having the average pixel color that is closest to the expected color of the marked line is indeed the marked line.

Referring to FIG. 2, at step 208 the method 200 includes determining a second angle between a second marked line on the runway in the second image and a second reference line in the second image. Referring to FIG. 3 for example, the computing device 100 can determine a second angle 316 between a second marked line 318 on the runway 30 in the second image 306 and a second reference line 320 in the second image 306. In the example of FIG. 3, the second marked line 318 is the centerline 20 of the runway 30 and the second reference line 320 is the horizon 328. In other examples (e.g., those discussed below), the second marked line takes on different forms. The second reference line 320 could alternatively take the form of any line that is substantially parallel with the horizon 328 in the second image 306.

As shown in FIG. 3, the second reference line 320 forms an adjacent side of a right triangle 337 and the second marked line 318 forms a hypotenuse of the right triangle 337 with respect to the second angle 316. An opposite side 335 of the right triangle 337 is shown in FIG. 3, but could take the form of any line segment that forms a right angle with the second reference line 320 and has endpoints respectively at the second reference line 320 and the second marked line 318.

In some examples, the computing device 100 determines the second angle 316 by calculating the arcsine of the quotient of the length of the opposite side 335 divided by the length of a portion of the second marked line 318 (e.g., the hypotenuse of the right triangle 337).

In some examples, prior to determining the second angle 316, the computing device 100 identifies the second marked line 318 by determining that the second marked line 318, the third marked line 324 (e.g., a left boundary line), and the fourth marked line 326 (e.g., a right boundary line) converge at or beyond the horizon 328 within the second image 306. Additionally, the computing device 100 can identify the second marked line 318, the third marked line 324, and the fourth marked line 326 based on determining that the third marked line 324 is to the left of the second marked line 318, and that the second marked line 318 is to the left of the fourth marked line 326.

FIG. 6 illustrates an additional example of the disclosure in which the first marked line 312 takes the form of a left boundary line of the runway 30 and the second marked line 318 takes the form of a right boundary line of the runway 30. As such, the computing device 100 can determine the first angle 310 between the first marked line 312 in the first image 302 and the first reference line 314 in the first image 302, in accordance with step 206.

As shown in FIG. 6, the first reference line 314 forms an adjacent side of a right triangle and the first marked line 312 forms a hypotenuse of the right triangle with respect to the first angle 310. An opposite side of the right triangle is not shown in FIG. 6, but could take the form of any line segment that forms a right angle with the first reference line 314 and has endpoints respectively at the first reference line 314 and the first marked line 312.

In some examples, prior to determining the first angle 310, the computing device 100 identifies the first marked line 312 by determining that the first marked line 312, the centerline 20, and a fourth marked line 326 (e.g., a right boundary line) converge at or beyond the horizon 328 within the first image 302. Additionally, the computing device 100 can identify the first marked line 312, the centerline 20, and the fourth marked line 326 based on determining that the first marked line 312 is to the left of the centerline 20, and that the centerline 20 is to the left of the fourth marked line 326.

Referring back to FIG. 2, in accordance with step 208 and as shown in FIG. 6, the computing device 100 can determine the second angle 316 between the second marked line 318 in the second image 306 and the second reference line 320 in the second image 306.

As shown in FIG. 6, the second reference line 320 forms an adjacent side of a right triangle and the second marked line 318 forms a hypotenuse of the right triangle with respect to the second angle 316. An opposite side of the right triangle is not shown in FIG. 6, but could take the form of any line segment that forms a right angle with the second reference line 320 and has endpoints respectively at the second reference line 320 and the second marked line 318.

In some examples, prior to determining the second angle 316, the computing device 100 identifies the second marked line 318 by determining that the second marked line 318, the centerline 20, and the third marked line 324 (e.g., a left boundary line) converge at or beyond the horizon 328 within the second image 306. Additionally, the computing device 100 can identify the second marked line 318, the centerline 20, and the third marked line 324 based on determining that the second marked line 318 is to the right of the centerline 20, and that the centerline 20 is to the right of the third marked line 324.

FIG. 7 illustrates an additional example of the disclosure in which the first marked line 312 takes the form of a right boundary line of the runway 30 and the second marked line 318 takes the form of a left boundary line of the runway 30. As such, the computing device 100 can determine the first angle 310 between the first marked line 312 in the first image 302 and the first reference line 314 in the first image 302, in accordance with step 206.

As shown in FIG. 7, the first reference line 314 forms an adjacent side of a right triangle and the first marked line 312 forms a hypotenuse of the right triangle with respect to the first angle 310. An opposite side of the right triangle is not shown in FIG. 7, but could take the form of any line segment that forms a right angle with the first reference line 314 and has endpoints respectively at the first reference line 314 and the first marked line 312.

In some examples, prior to determining the first angle 310, the computing device 100 identifies the first marked line 312 by determining that the first marked line 312, the centerline 20, and the third marked line 324 (e.g., a left boundary line) converge at or beyond the horizon 328 within the first image 302. Additionally, the computing device 100 can identify the first marked line 312, the centerline 20, and the third marked line 324 based on determining that the first marked line 312 is to the right of the centerline 20, and that the centerline 20 is to the right of the third marked line 324.

Referring back to FIG. 2, in accordance with step 208 and as shown in FIG. 7, the computing device 100 can determine the second angle 316 between the second marked line 318 in the second image 306 and the second reference line 320 in the second image 306.

As shown in FIG. 7, the second reference line 320 forms an adjacent side of a right triangle and the second marked line 318 forms a hypotenuse of the right triangle with respect to the second angle 316. An opposite side of the right triangle is not shown in FIG. 7, but could take the form of any line segment that forms a right angle with the second reference line 320 and has endpoints respectively at the second reference line 320 and the second marked line 318.

In some examples, prior to determining the second angle 316, the computing device 100 identifies the second marked line 318 by determining that the second marked line 318, the centerline 20, and the fourth marked line 326 (e.g., a right boundary line) converge at or beyond the horizon 328 within the second image 306. Additionally, the computing device 100 can identify the second marked line 318, the centerline 20, and the fourth marked line 326 based on determining that the second marked line 318 is to the left of the centerline 20, and that the centerline 20 is to the left of the fourth marked line 326.

Figure 9:
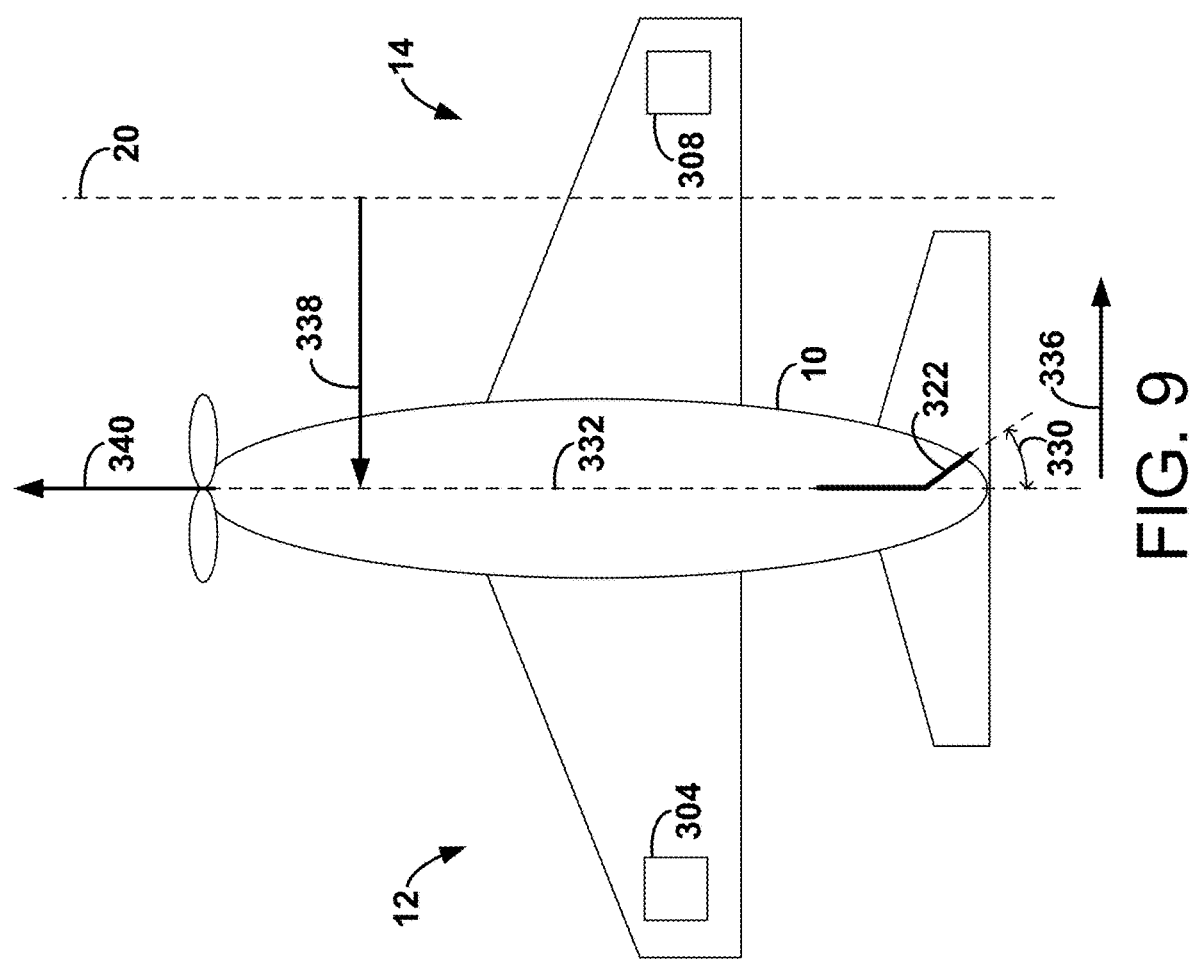
FIG. 9 is a schematic overhead view of an aircraft, according to an example.

Referring to FIG. 2, at step 210 the method 200 includes, based on the first angle and the second angle, moving a control surface of the aircraft such that the aircraft moves closer to the centerline of the runway. Referring to FIG. 8 and FIG. 9 for example, the computing device 100 can, based on the first angle 310 and the second angle 316, move the control surface 322 such that the aircraft 10 moves closer to the centerline 20 of the runway 30 (e.g., during forward motion of the aircraft 10).

In some examples, the computing device 100 can determine a difference between the first angle 310 and the second angle 316 and move the control surface 322 based on the difference. FIG. 8 illustrates an example in which the first angle 310 is less than the second angle 316 such that the difference of the first angle 310 minus the second angle 316 is negative. In this example, the aircraft is displaced to the left with respect to the centerline 20 (see FIG. 9). As such, the computing device 100 can move the control surface 322 to the right of the centerline 332 with a deflection angle 330 between the control surface 322 and the centerline 332. In this context, the deflection angle 330 can be defined by a function that monotonically increases with respect to the difference of the second angle 316 minus the first angle 310. That is, as the difference of the second angle 316 minus the first angle 310 increases, so does the deflection angle 330 in FIG. 9.

FIG. 11 shows one possible relationship between (i) the magnitude of the difference between the first angle 310 and the second angle 316 (e.g., $|\theta_1-\theta_2|$) and (ii) the magnitude of the deflection angle 330 (e.g., $|\theta_d|$). For values of $|\theta_1-\theta_2|$ that are less than about 90 degrees (e.g., point 339), the magnitude of the deflection angle 330 is approximately proportional to $|\theta_1-\theta_2|$. For values of $|\theta_1-\theta_2|$ that are greater than about 90 degrees, the magnitude of the deflection angle 330 becomes somewhat non-linear as shown in FIG. 11.

FIG. 10 illustrates an example in which the first angle 310 is greater than the second angle 316 such that the difference of the first angle 310 minus the second angle 316 is positive. In this example, the aircraft is displaced to the right with respect to the centerline 20 (see FIG. 4). As such, the computing device 100 can move the control surface 322 to the left of the centerline 332 with a deflection angle 330 between the control surface 322 and the centerline 332. In this context, the deflection angle 330 can be defined by a function that monotonically increases with respect to the difference of the first angle 310 minus the second angle 316. That is, as the difference of the first angle 310 minus the second angle 316 increases, so does the deflection angle 330 in FIG. 4.

The computing device 100 can determine a direction 334 in which the aircraft is displaced from the centerline 20 of the runway 30 based on the first angle 310 and the second angle 316. Referring to FIG. 10 for example, the computing device 100 can determine that the first angle 310 is greater than the second angle 316, and then determine that the aircraft 10 is displaced in the direction 334 (e.g., to the right) with respect to the centerline 20. In this context, the computing device 100 can move the control surface 322 in direction 336 (e.g., to the left) as shown in FIG. 4. Referring to FIG. 8 for example, the computing device 100 can determine that the first angle 310 is less than the second angle 316, and then determine that the aircraft 10 is displaced in the direction 334 (e.g., to the left) with respect to the centerline 20. In this context, the computing device 100 can move the control surface 322 in the direction 336 (e.g., to the right) as shown in FIG. 9.

Referring to the examples of FIG. 4 and FIG. 9, the computing device 100 can determine a distance 338 that the aircraft 10 is displaced from the centerline 20 of the runway 30 based on the first angle 310 and the second angle 316. In FIG. 4 for example, the computing device 100 can determine that the aircraft 10 is displaced to the right of the centerline 20 based on the difference between the first angle 310 and the second angle 316. The larger the difference of the first angle 310 minus the second angle 316, the larger the distance 338 in FIG. 4. As such, the computing device 100 can move the control surface 322 to the left to form the deflection angle 330 that is defined by a function that monotonically increases with respect to the distance 338.

In FIG. 9 for example, the computing device 100 can determine that the aircraft 10 is displaced to the left of the centerline 20 based on the difference between the first angle 310 and the second angle 316. The larger the difference of the second angle 316 minus the first angle 310, the larger the distance 338 in FIG. 9. As such, the computing device 100 can move the control surface 322 to the right to form the deflection angle 330 that is defined by a function that monotonically increases with respect to the distance 338.

In some examples, the computing device 100 can account for a heading of the aircraft 10. Referring to FIG. 4 and FIG. 9 for example, if the heading 340 of the aircraft 10 points away from the centerline 20, the computing device 100 can increase the deflection angle 330. In contrast, if the heading 340 of the aircraft 10 points toward the centerline 20, the computing device 100 can decrease the deflection angle 330.

In some examples, the computing device 100 can account for a speed of the aircraft 10 as the aircraft 10 travels down the runway 30. For example, for lower speeds of the aircraft 10, the computing device 100 can increase the deflection angle 330. For higher speeds of the aircraft 10, the computing device 100 can decrease the deflection angle 330.

In some examples, the computing device 100 can determine that a particular line marked on the runway is obscured, for example, by snow. Referring to FIG. 3 for example, if the computing device 100 determines that either a left boundary line or a right boundary line of the runway 30 is obscured, the computing device 100 can perform the above methods with the centerline 20 taking the form of the first marked line 312 in the first image 302 and taking the form of the second marked line 318 in the second image 306. Referring to FIG. 6 for example, if the computing device 100 determines that the centerline 20 of the runway 30 is obscured, the computing device 100 can perform the above methods with a left boundary line of the runway 30 taking the form of the first marked line 312 and a right boundary line taking the form of the second marked line 318. Referring to FIG. 7 as another example, if the computing device 100 determines that the centerline 20 of the runway 30 is obscured, the computing device 100 can perform the above methods with a right boundary line of the runway 30 taking the form of the first marked line 312 and a left boundary line taking the form of the second marked line 318.

Examples of the present disclosure can thus relate to one of the enumerated clauses (EC) listed below.

EC 1 is a computing device comprising: one or more processors; and a computer readable medium storing instructions that, when executed by the one or more processors, cause the computing device to perform functions for aligning an aircraft with a centerline of a runway during takeoff, the functions comprising: accessing a first image captured by a first camera mounted on a first side of the aircraft; accessing a second image captured by a second camera mounted on a second side of the aircraft that is opposite the first side; determining a first angle between a first marked line on the runway in the first image and a first reference line in the first image; determining a second angle between a second marked line on the runway in the second image and a second reference line in the second image; and based on the first angle and the second angle, moving a control surface of the aircraft such that the aircraft moves closer to the centerline of the runway.

EC 2 is the computing device of EC 1, the functions further comprising, prior to determining the first angle, identifying the first marked line by determining that the first marked line, a third marked line, and a fourth marked line converge at or beyond a horizon within the first image.

EC 3 is the computing device of any of ECs 1-2, wherein the first reference line forms an adjacent side of a right triangle with respect to the first angle, and wherein the first marked line forms a hypotenuse of the right triangle.

EC 4 is the computing device of any of ECs 1-3, wherein the first marked line is the centerline of the runway, and wherein the second marked line is also the centerline of the runway.

EC 5 is the computing device of any of ECs 1-3, wherein the first side of the aircraft is a port side of the aircraft, wherein the second side of the aircraft is a starboard side of the aircraft, wherein the first marked line is a left boundary line of the runway, and wherein the second marked line is a right boundary line of the runway.

EC 6 is the computing device of any of ECs 1-3, wherein the first side of the aircraft is a port side of the aircraft, wherein the second side of the aircraft is a starboard side of the aircraft, wherein the first marked line is a right boundary line of the runway, and wherein the second marked line is a left boundary line of the runway.

EC 7 is the computing device of any of ECs 1-6, wherein the first reference line is substantially parallel to a horizon in the first image, and wherein the second reference line is substantially parallel to the horizon in the second image.

EC 8 is the computing device of any of ECs 1-7, wherein the first image and the second image are captured substantially simultaneously.

EC 9 is the computing device of any of ECs 1-8, wherein the aircraft is an unmanned aerial vehicle.

EC 10 is the computing device of any of ECs 1-9, wherein the first camera and the second camera are positioned substantially symmetrically with respect to a centerline of the aircraft.

EC 11 is the computing device of any of ECs 1-10, wherein the control surface is a rudder.

EC 12 is the computing device of any of ECs 1-11, the functions further comprising determining a difference between the first angle and the second angle, wherein moving the control surface comprises moving the control surface based on the difference.

EC 13 is the computing device of EC 12, wherein moving the control surface based on the difference comprises moving the control surface to form a deflection angle between the control surface and a centerline of the aircraft, wherein the deflection angle is defined by a function that monotonically increases with respect to the difference.

EC 14 is the computing device of any of ECs 1-13, the functions further comprising determining a direction in which the aircraft is displaced from the centerline of the runway based on the first angle and the second angle, wherein moving the control surface comprises moving the control surface such that the control surface is displaced, with respect to a centerline of the aircraft, in a direction that is opposite the determined direction.

EC 15 is the computing device of any of ECs 1-14, the functions further comprising determining a distance that the aircraft is displaced from the centerline of the runway based on the first angle and the second angle, wherein moving the control surface comprises moving the control surface to form a deflection angle between the control surface and a centerline of the aircraft, wherein the deflection angle is defined by a function that monotonically increases with respect to the distance.

EC 16 is the computing device of any of ECs 1-15, the functions further comprising determining a heading (340) of the aircraft based on the first angle and the second angle, wherein moving the control surface comprises moving the control surface based on the heading.

EC 17 is the computing device of any of ECs 1-16, the functions further comprising identifying the first marked line by identifying, from among a plurality of lines of pixels of the first image, a line of pixels having an average color that is closest to a color of the first marked line.

EC 18 is the computing device of any of ECs 1-17, the functions further comprising determining that a third marked line on the runway in the first image is obscured, wherein determining the first angle comprises determining the first angle based on determining that the third marked line on the runway in the first image is obscured.

EC 19 is a non-transitory computer readable medium storing instructions that, when executed by a computing device, cause the computing device to perform functions for aligning an aircraft with a centerline of a runway during takeoff, the functions comprising: accessing a first image captured by a first camera mounted on a first side of the aircraft; accessing a second image captured by a second camera mounted on a second side of the aircraft that is opposite the first side; determining a first angle between a first marked line on the runway in the first image and a first reference line in the first image; determining a second angle between a second marked line on the runway in the second image and a second reference line in the second image; and based on the first angle and the second angle, moving a control surface of the aircraft such that the aircraft moves closer to the centerline of the runway.

EC 20 is a method for aligning an aircraft with a centerline of a runway during takeoff, the method comprising: accessing a first image captured by a first camera mounted on a first side of the aircraft; accessing second image captured by a second camera mounted on a second side of the aircraft that is opposite the first side; determining a first angle between a first marked line on the runway in the first image and a first reference line in the first image; determining a second angle between a second marked line on the runway in the second image and a second reference line in the second image; and based on the first angle and the second angle, moving a control surface of the aircraft such that the aircraft moves closer to the centerline of the runway.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A computing device comprising:
   one or more processors; and
   a computer readable medium storing instructions that, when executed by the one or more processors, cause the computing device to perform functions for aligning an aircraft with a centerline of a runway during takeoff, the functions comprising:
      accessing a first image captured by a first camera mounted on a first side of the aircraft;
      accessing a second image captured by a second camera mounted on a second side of the aircraft that is opposite the first side;
      determining a first angle between a first marked line on the runway in the first image and a first reference line in the first image;
      determining a second angle between a second marked line on the runway in the second image and a second reference line in the second image; and
      based on the first angle and the second angle, autonomously moving a control surface of the aircraft such that the aircraft moves closer to the centerline of the runway.

2. The computing device of claim 1, the functions further comprising, prior to determining the first angle, identifying the first marked line by determining that the first marked line, a third marked line, and a fourth marked line converge at or beyond a horizon within the first image.

3. The computing device of claim 1,
   wherein the first reference line forms an adjacent side of a right triangle with respect to the first angle, and
   wherein the first marked line forms a hypotenuse of the right triangle.

4. The computing device of claim 1,
   wherein the first marked line is the centerline of the runway, and
   wherein the second marked line is also the centerline of the runway.

5. The computing device of claim 1,
   wherein the first side of the aircraft is a port side of the aircraft,
   wherein the second side of the aircraft is a starboard side of the aircraft,
   wherein the first marked line is a left boundary line of the runway, and
   wherein the second marked line is a right boundary line of the runway.

6. The computing device of claim 1,
   wherein the first side of the aircraft is a port side of the aircraft,
   wherein the second side of the aircraft is a starboard side of the aircraft,
   wherein the first marked line is a right boundary line of the runway, and
   wherein the second marked line is a left boundary line of the runway.

7. The computing device of claim 1,
   wherein the first reference line is substantially parallel to a horizon in the first image, and
   wherein the second reference line is substantially parallel to the horizon in the second image.

8. The computing device of claim 1, wherein the first image and the second image are captured substantially simultaneously.

9. The computing device of claim 1, wherein the aircraft is an unmanned aerial vehicle.

10. The computing device of claim 1, wherein the first camera and the second camera are positioned substantially symmetrically with respect to a centerline of the aircraft.

11. The computing device of claim 1, wherein the control surface is a rudder.

12. The computing device of claim 1, the functions further comprising determining a difference between the first angle and the second angle,
   wherein moving the control surface comprises moving the control surface based on the difference.

13. The computing device of claim 12, wherein moving the control surface based on the difference comprises moving the control surface to form a deflection angle between the control surface and a centerline of the aircraft, wherein the deflection angle is defined by a function that monotonically increases with respect to the difference.

14. The computing device of claim 1, the functions further comprising determining a direction in which the aircraft is displaced from the centerline of the runway based on the first angle and the second angle,
   wherein moving the control surface comprises moving the control surface such that the control surface is displaced, with respect to a centerline of the aircraft, in a direction that is opposite the determined direction.

15. The computing device of claim 1, the functions further comprising determining a distance that the aircraft is displaced from the centerline of the runway based on the first angle and the second angle,
   wherein moving the control surface comprises moving the control surface to form a deflection angle between the control surface and a centerline of the aircraft, wherein the deflection angle is defined by a function that monotonically increases with respect to the distance.

16. The computing device of claim 1, the functions further comprising determining a heading of the aircraft based on the first angle and the second angle,
   wherein moving the control surface comprises moving the control surface based on the heading.

17. The computing device of claim 1, the functions further comprising identifying the first marked line by identifying, from among a plurality of lines of pixels of the first image, a line of pixels having an average color that is closest to a color of the first marked line.

18. The computing device of claim 1, the functions further comprising determining that a third marked line on the runway in the first image is obscured,
   wherein determining the first angle comprises determining the first angle based on determining that the third marked line on the runway in the first image is obscured.

19. A non-transitory computer readable medium storing instructions that, when executed by a computing device, cause the computing device to perform functions for aligning an aircraft with a centerline of a runway during takeoff, the functions comprising:
   accessing a first image captured by a first camera mounted on a first side of the aircraft;

accessing a second image captured by a second camera mounted on a second side of the aircraft that is opposite the first side;

determining a first angle between a first marked line on the runway in the first image and a first reference line in the first image;

determining a second angle between a second marked line on the runway in the second image and a second reference line in the second image; and based on the first angle and the second angle, autonomously moving a control surface of the aircraft such that the aircraft moves closer to the centerline of the runway.

20. A method for aligning an aircraft with a centerline of a runway during takeoff, the method comprising:

accessing a first image captured by a first camera mounted on a first side of the aircraft;

accessing a second image captured by a second camera mounted on a second side of the aircraft that is opposite the first side;

determining a first angle between a first marked line on the runway in the first image and a first reference line in the first image;

determining a second angle between a second marked line on the runway in the second image and a second reference line in the second image; and based on the first angle and the second angle, autonomously moving a control surface of the aircraft such that the aircraft moves closer to the centerline of the runway.

* * * * *